Figure 1:
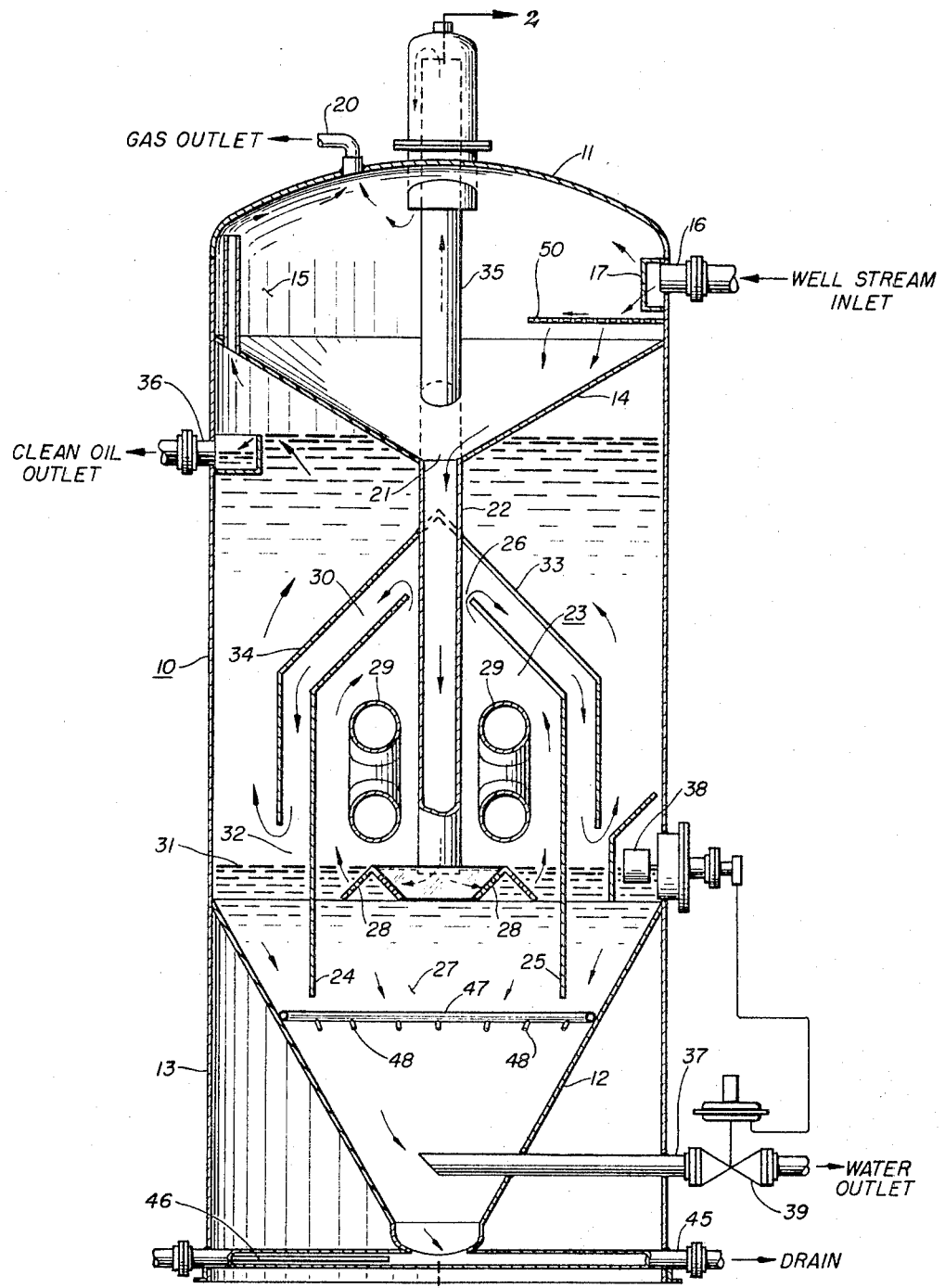

INVENTOR.
PAUL E. MEYER
BY
ATTORNEY

United States Patent Office 3,273,318
Patented Sept. 20, 1966

3,273,318
DE-SANDING EMULSION TREATER
Paul E. Meyer, Tulsa, Okla., assignor to National Tank Company, Tulsa, Okla., a corporation of Nevada
Filed Feb. 10, 1964, Ser. No. 343,587
3 Claims. (Cl. 55—175)

This invention relates to new and useful improvements in means for treating emulsified well streams containing sand or other foreign matter.

The invention is directed in particular to emulsion treaters and especially adapted to the handling of well streams containing quantities of emulsified oil and also containing quantities of solid foreign material which will normally be sand flowing from the producing formation along with the well stream. The invention is also particularly adapted to the resolving of emulsions in well streams containing large quantities of water in either the free or emulsion bound states.

There are types of petroleum wells which, during some stage of their productive life, or possibly throughout their productive life, produce well streams containing quantities of foreign material, such as sand, and may also produce considerable quantities of water along with the petroleum fluids. In many cases, at least a portion of the oil which is present may be loosely or more or less tightly bound into an oil and water emulsion resulting in the necessity of passing the well stream through an emulsion treater for resolution of the emulsified portion of the well stream into its water and clean oil components. Manifestly, where quantities of foreign matter such as sand are present in the well stream, there arises the problem of settling and accumulation of sand or other material in the emulsion treater, creating the necessity for periodic cleaning of the emulsion treater, an operation that normally requires that the treater be taken out of operation during the cleaning process. This not only results in temporary loss of the use of the emulsion treater, but also involves a considerable labor expense.

It is, therefore, a principal object of this invention to provide improved emulsion treating means wherein provision is made for removal of accumulated sand or other material without interruption of treating of the emulsion so as to provide for continuous processing of the well stream and effective resolution of the emulsified portions thereof.

An additional object of the invention is to provide an improved emulsion treater for well streams in which all horizontal surfaces are eliminated, there being employed only vertical or inclined partitions, walls, and other elements within the treating vessel whereby the effective settling of sand or other foreign material to the lower portion of the emulsion treater for ready removal is encouraged and effectively carried out.

A still further object of the invention is to provide improved means for treating well streams having emulsified portions and also containing foreign material such as sand, in which provision is made for approximately continuous withdrawal of separated water along with sand and other foreign material settling from the water and the well stream, whereby the accumulation of any appreciable quantity of foreign material within the treating zone is avoided, the foreign material being removed substantially at the rate at which it is introduced.

Still another object of the invention is to provide improved means for the treatment of emulsified well streams containing sand or other foreign material in which the well stream is carried through a preliminary gas separation step and then distributed in a large compartment where heat is applied to resolve the emulsion and lower the viscosity of the liquids in the stream to allow substantial amounts of sand and other foreign material to fall from the compartment for removal.

Yet another object of the invention is to flow the oil and emulsion from the top of the heating compartment and increase the velocity of the movement of the liquids in a downward direction until the liquids are released near the interface between water and emulsion and oil at which point in the travel of the liquids additional amounts of foreign matter and sand are carried downwardly for removal while the oil and emulsion start an upward travel at a slow rate for coalescence of the oil into the product of the process.

A construction designed to carry out the invention will be hereinafter described, together with other features of the invention.

Figure 2:
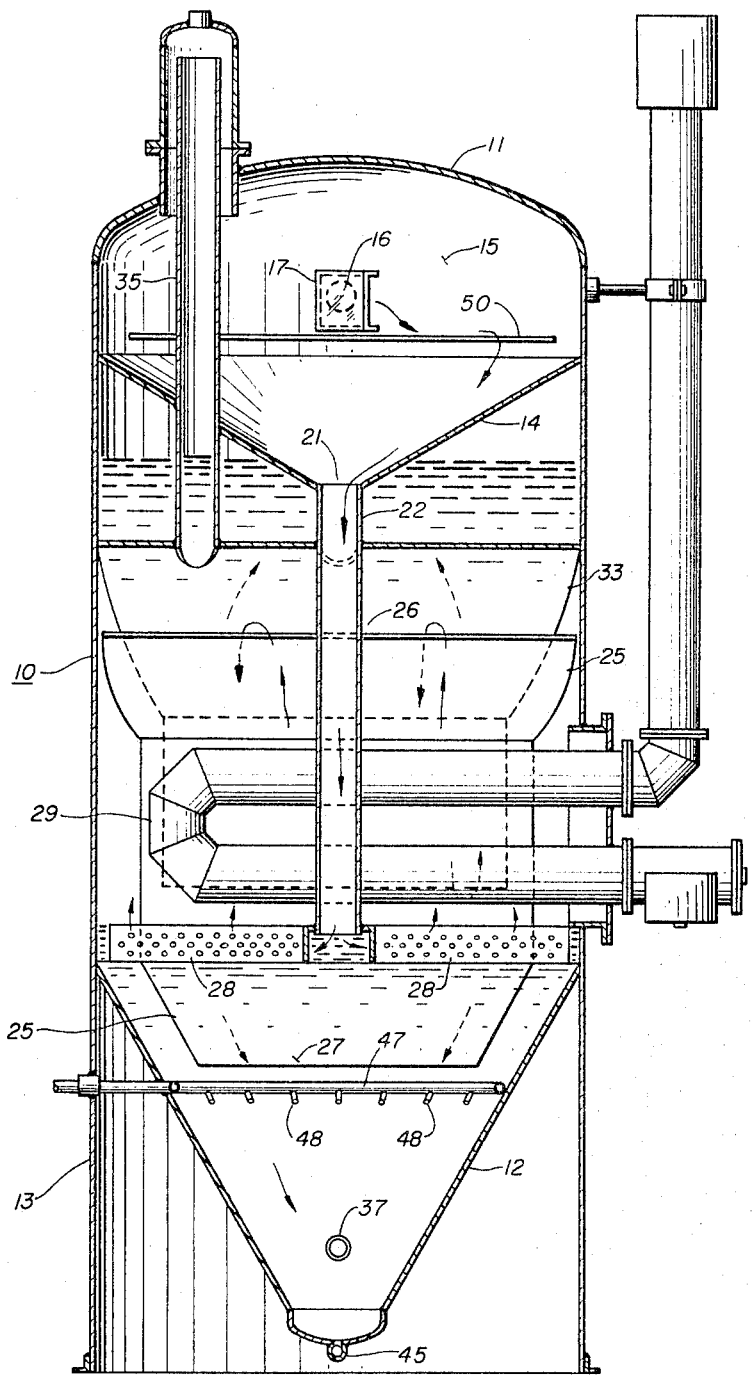

The invention will be more readily understood from a reading of the following specification and by reference to the accompanying drawings, wherein examples of the invention are shown, and wherein:

FIG. 1 is a vertical sectional view of an emulsion treater constructed in accordance with this invention and adapted to carry out the methods hereof, and FIG. 2 is a vertical, sectional view taken at right angles to FIG. 1 upon the line 2—2 thereof.

In the drawings, the numeral 10 designates an upright cylindrical vessel having a domed upper end or head 11 and a conical bottom 12 with rather steeply inclined walls, the vessel being carried upon a cylindrical support or base member 13 forming a continuation of the outer walls of the vessel 10. In the upper portion of the vessel there is provided a conical partition 14 enclosing in the upper end of the vessel a preliminary gas separation chamber 15 having a well stream inlet conductor 16 opening into the separation chamber through a diverter box 17. The partition 14 is conical in configuration, all portions of the partition being inclined smoothly downwardly so that all liquids, foreign material such as sand, and the like, are caused to flow or move downwardly over the upper surface of the partition 14 to the lowest point thereof which is disposed centrally of the vessel 10.

The incoming well stream is spread by the diverter box 17 and caused to flow in a thin layer through a circumferential path about the walls of the preliminary gas separation chamber 15 whereby quantities of gas are separated from the well stream and small bubbles of gas encouraged to break through the surface of the thinly spread oil layer. The separated gas is withdrawn through gas outlet pipe 20 while, as stated above, the separated liquids and any foreign material which may be present settle by gravity upon the partition 14. It is to be noted that the separated liquids are comparatively cool as compared to other liquids and vapors present within the emulsion treating structure and that the chamber 15, along with the partition 14, is maintained relatively cool.

The separated liquids, with their entrained foreign particles such as sand, on partition 14 flow downwardly through opening 21 in partition 14. Downcomer 22 is connected to opening 21 by its upper end and extends vertically downward to distribution structure in the lower portion of the vessel 10. The distribution structure, and a heat source, are both located in a compartment where the oil and emulsion of the liquids are heated.

Downcomer 22 takes the separated liquids of the stream as quickly as feasible to distribution in the lower portion of the treater. The compartment in which the distribution, and heating, of the liquids takes place is sized large enough to cause the ascending oil and emulsion to rise with relative slowness. The sand and foreign matter drop from the compartment into the bottom of the vessel. Water developed by the heating of the liquids also falls to the bottom of the vessel. In this process, heat is applied as quickly as feasible to lower the viscosity of the liquid far enough for early removal of a substantial portion of the water, sand and foreign matter in the well stream.

The compartment within the vessel, in which the initial heating of the stream takes place, is in the lower part of the vessel. The compartment is actually defined by partitions mounted within the lower portion of the vessel. The partitions are mounted in a generally vertical orientation so as to leave the compartment effectively bottomless and with a large opening at its top. The size of the compartment, relative to the remaining volume of the vessel, is large although no fixed ratio between the two volumes is imposed as a limitation on the invention. The basic objective in sizing the compartment is to provide a slow rate of upward flow for the oil and emulsion as heat is applied to the liquids. Water and foreign matter can then readily drop from the liquids when the heat lowers their viscosity. The first stage of ejecting sand, and such foreign material, from the oil and emulsion is completed.

In specifically forming compartment 23, partitions 24, 25 are mounted within the lower part of vessel 10. Between partitions 24, 25 and the walls of vessel 10 compartment 23 is formed as a simple volume. The upper portions of partitions 24, 25 are slanted inwardly to reduce the volume provided by the compartment as the liquids move upwardly. Therefore, the velocity of the liquids will be increased as they leave the compartment at its top. The upper exit for the liquids is indicated at 26, being merely the space between the upper edges of partitions 24, 25. The lower ends of partitions 24, 25 extend well down in the vessel, below the distributing point for the liquids; the lower exit from the compartment 23 is then indicated at 27, between the lower edges of partitions 24, 25.

The compartment 23 provides a volume large enough that the incoming liquids will rise with relatively low velocity. Any free water will quickly drop through exit 27 and collect in a body for removal from vessel 10. Sand, and similar foreign matter will also sink to the bottom. As the oil and emulsion is heated, the lowered viscosity of these liquids will permit disengagement of the sand an additional water will be broken from the emulsion. Unbroken emulsion, and some sand, will be carried along, out upper exit 26. However, a substantial portion of the sand and water will be dropped from compartment 23 because of the heat supplied directly to the liquids in a compartment large enough to provide the time for heat and gravity to produce the desired disengagement.

The distribution of the liquids from separation chamber 15 is provided by perforated baffles 28. These baffles are mounted on, or near, the lower end of downcomer 22. The liquids of downcomer 22 are discharged beneath baffles 28 and the rising oil and emulsion spreads over their lower surfaces, flowing up through their perforations.

The heat source in compartment 23 may be any one of the many available sources of heat for this general purpose. Directly fired tubes 29 are shown, of conventional design, but the amount and type of liquids heated may determine the specific type of heat source desired in any particular actual reduction to practice. In any event, the separated liquids are taken directly to the heat source in compartment 23, distributed over the heat source to further the exchange of heat to the liquid, and provided with sufficient volume to slow their ascendancy to exit 26 while water and sand fall to exit 27.

Next, a passageway 30 is provided to receive the liquids discharged through exit 26 and flow these liquids downwardly with a velocity substantially greater than the velocity with which the liquids rose in compartment 23. Sand may remain entrained in the oil and emulsion despite the opportunity given the disengaging forces of heat and gravity in compartment 23 to remove this material. In passageway 30 another provision is made for the ejection of sand, and water, from the liquids.

Passageway 30 has been formed to provide a volume small enough to increase the velocity of the flow of liquids downwardly from exit 26. Passageway 30 terminates close to interface 31 which is well down the sides of baffles 24, 25. As the liquids are released from passageway 30 at exit 32 the sand and water will tend to continue downward and join the sand and water of exit 27. The oil and emulsion will tend to flow downward to some extent but will quickly turn around and start to rise in the remaining volume of the vessel 10. Therefore, a second stage of desanding is provided.

Passageway 30 is formed with simple baffles 33, 34 arranged in parallel, down along the sides of baffles 24, 25. These baffles 33, 34 are joined at their top edges and thereby form a hood with respect to the complete compartment 23. The compartment 23 is then connected to passageway 30 at exit 26 which is at the middle of passageway 30. Gas evolves from the heated hydrocarbons rising within compartment 23 and collects beneath this hood. Riser conduit 35 is provided to connect into the hood at this point and convey the gas collected to the top of separation chamber 15 where it joins gas evolved from the well stream as the well stream is introduced into chamber 15. With this arrangement, the gas evolved by the firetubes 29 is prevented from being carried along with the liquids in passageway 30, released at 32 and disturbing the coalescing which takes place after the release at 32.

Once the oil and emulsion is released from passageway 30 at exit 32 and starts to rise, the conventional coalescence of oil and water starts to complete the over-all process. The water agglomerated falls to the bottom of the vessel 10 and the oil rises to the top, just beneath partition 14. The clean oil is drawn off through conduit 36 as a product of the process. The gas has already been discussed as another product of the process, drawn off through conduit 20.

The water is drawn off the bottom of vessel 10 through conduit 37. The interface 31 is maintained just below the firetube 29 by sensing its height with float 38 and controlling valve 39 in water draw-off conduit 37 with the float.

The separated sand settles into the cone-shaped or hopper-like bottom 12. For removal of this accumulated sand, a pipe 45 extends transversely of the supporting structure 13, the lowermost portion of the cone-shaped bottom 12 opening into the pipe 45, and there being provided interiorly of the pipe 45 a sand jet 46 through which air or gas under pressure, or steam, or other suitable gases or liquids may be passed under pressure and at high velocity in order to jet and aspirate the sand from the conical bottom 12 into the pipe 45 and thence exteriorly of the vessel for disposal. There may also be provided an annular manifold 47 around the upper edge of the cone-shaped bottom 12 carrying a plurality of nozzles or jetting units 48 for washing sand and foreign material down the side walls of the bottom 12 for removal through the pipe 45.

The controls for the gas outlet and the oil outlet are not illustrated. The controls for fluid exits from pressure vessels of this type are well known arrangements and need not be disclosed to give illustration to this invention. The control of the water exit through conduit 37 is shown because it is carried out from the interface 31 which has a significant spatial relation to the lower edge of partitions 33, 34 in forming exit 32. Otherwise, it is not necessary to go into detail concerning these controls in order to disclose the invention embodied in the treater.

Among the miscellaneous features disclosed may be placed perforated spreader plate 50 which is mounted horizontally, just below inlet conduit 16 and its diverter 17. Diverter 17 functions as heretofore described when there is a large enough input of liquids to the treater. However, when the rate drops, the liquids are not spread along the walls of chamber 15 but the liquids more or less fall down toward partition 14.

Plate 50 is then brought into play by receiving the well stream thereon for spreading the liquids and breaking any foam that may be in the stream. The liquids fall through the perforations and break up the foam. If paraffin, sand, or other foreign particles clog the perforations of plate 50 to make it effectively inperforate, spreading still takes place to give a measure of foam breaking.

When the liquids are mechanically stabilized by foam in them being broken, the sand, and other foreign particles, therein will more readily disengage and fall toward the bottom of the treater. Therefore, plate 50 is a factor in the process of desanding the well stream.

Another feature which is not to be overlooked is the value of carrying the liquids from separation chamber 15 down centrally located downcomer 22. Downcomer 22 is located at the hottest section of the treater. The heated liquids of compartment 23 surround this downcomer as they ascend toward exit 26. The downcomer 22 passes in close proximity to firetubes 29. This arrangement gives a good opportunity to preheat the liquids before they are spread beneath firetubes 29 for their directly heated ascent through compartment 23. Therefore, a significant contribution is made to lowering the viscosity of the liquids as quickly as possible to give full opportunity for sand to drop to the bottom of the treater.

Still another feature is the slanting of the tops of baffles 24, 25 inwardly, toward each other, to form exit 26. This arrangement passes all ascending liquids above firetubes 29 and thereby insures their being heated efficiently as these liquids ascend toward exit 26. Uniform heating of the liquids is thereby further insured so the liquids will the more readily disengage from what portion of the sand is carried into passageway 30 for the descent toward interface 31.

From the foregoing it will be seen that this invention is one well adapted to attain all of the ends and objects hereinabove set forth, together with other advantages which are obvious and which are inherent to the apparatus, It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. An emulsion treater for petroleum well streams containing foreign matter such as sand including,
   an emulsion treating vessel having an inlet for well streams,
   a compartment formed within the vessel by upright walls which provide openings at the top and bottom of the compartment, a conduit connected between the inlet and bottom of the compartment for direct conductance of the liquids of the well stream to horizontal distribution in the compartment,
   heating means mounted within the compartment for initially raising the temperature of emulsion of the distributed liquids flowing upward through the compartment substantially more slowly than the liquids are conducted to the compartment so the viscosity of the emulsion will be lowered enough to allow substantial amounts of foreign matter in the emulsion to fall from the compartment and into the lower part of the vessel,
   means for maintaining an interface of water and oil and emulsion in the lower part of the vessel,
   a passageway formed by baffles on the outside of the compartment and closed in its connection to the opening at the top of the compartment to receive the upwardly flowing emulsion from the compartment and flow the emulsion downwardly at a velocity greater than the upward velocity within the compartment and release the emulsion within the vessel toward the interface,
   a coalescing section within the vessel above the discharge end of the passage and which is sized to receive the emulsion released toward the interface,
   and water and gas and clean oil outlets from the vessel.

2. An emulsion treater for petroleum well streams containing foreign matter such as sand including,
   a vessel elongated in the vertical direction,
   an inlet of the vessel for receiving a well stream into the upper portion of the vessel,
   a separation chamber in the upper portion of the vessel receiving the well stream to separate gas from the stream,
   a compartment in the vessel and below the separation chamber and formed by partition walls extending generally in the vertical direction to form the compartment with a large opening at the bottom and a relatively smaller opening at the top,
   a passage connected between the separation chamber and the compartment for conducting the well stream liquids from the separation chamber directly to the lower part of the compartment,
   means for spreading and distributing the liquids horizontally at the lower part of the compartment,
   heating means mounted within the compartment and above the spreading and distributing means so the emulsion and oil of the liquids will flow upwardly over the heating means substantially more slowly than they were conducted to the compartment and have their temperature initially raised until the viscosity of the emulsion is lowered enough to allow substantial amounts of foreign matter in the emulsion to fall from the liquids and out the lower compartment opening and into the lower part of the vessel,
   means for maintaining an interface of water and oil and emulsion in the lower part of the vessel,
   a passageway formed by baffles on the outside of the compartment and closed in its connection to the opening at the top of the compartment to receive the upwardly flowing and heated emulsion and oil and flow these liquids and any foreign matter retained therein downwardly within the vessel at a velocity greater than the upward velocity of these same liquids within the compartment and release the oil and emulsion within the vessel toward the interface of water and oil and emulsion maintained in the lower part of the vessel,
   a coalescing section within the vessel above the discharge end of the passage and which is sized to receive the emulsion released toward the interface,
   a passage connected to the passageway receiving the heated liquids to convey any gas evolved upward to the separation chamber,
   and water and gas and clean oil outlets from the vessel.

3. An emulsion treater for petroleum well streams containing foreign matter such as sand including,
   a vessel elongated in the vertical direction,
   an inlet of the vessel for receiving a well stream into the upper portion of the vessel,
   a separation chamber in the upper portion of the vessel receiving the well stream to separate gas from the stream,
   a horizontal plate mounted in the separation chamber below the inlet for the well stream so as to receive the liquids of the stream thereon at relatively low rates of input flow and spread the liquids into a thin film to break foam in the stream, a compartment in the vessel and below the separation chamber and formed by partition walls which extend generally parallel to one another in the vertical direction, slanting toward each other in their upper portions to form an upper exit from the compartment, a downcomer from the separation chamber for the well stream liquids which passes through the upper exit of the compartment to the lower part of the compartment, means for spreading and distributing the liquids horizontally at the lower end of the compartment, heating means mounted within the compartment above the spreading and distributing means so the emulsion and oil of the liquids will flow upwardly over the heating means and have their temperature raised until the viscosity of the emulsion is lowered enough to allow substantial amounts of foreign matter in the emulsion to fall from the liquids and out the lower compartment opening and into the lower part of the vessel, a passageway formed by baffles around the outside of the compartment and connected to the opening at the top of the compartment to receive the upwardly flowing and heated emulsion and oil and flow these liquids and any foreign matter retained therein downwardly within the vessel at a velocity greater than the upward velocity of these same liquids within the compartment and release the oil and emulsion within the vessel near the interface of water and oil and emulsion maintained in the lower part of the vessel, a coalescing section within the vessel above the discharge end of the passage sized to receive the emulsion released near the interface and slow the upward velocity of the oil and emulsion, a passage connected to the passageway receiving the heated liquids to convey any gas evolved upward to the separation chamber, and water and gas and clean oil outlets from the vessel.

References Cited by the Examiner

UNITED STATES PATENTS

| | | | |
|---|---|---|---|
| 1,908,581 | 5/1933 | Walker | 55—187 X |
| 2,765,917 | 10/1956 | Francis | 55—175 X |
| 3,009,536 | 11/1961 | Glasgow | 55—45 X |
| 3,087,292 | 4/1963 | Glasgow | 55—175 |

REUBEN FRIEDMAN, *Primary Examiner.*

R. W. BURKS, *Assistant Examiner.*